Patented Aug. 17, 1943

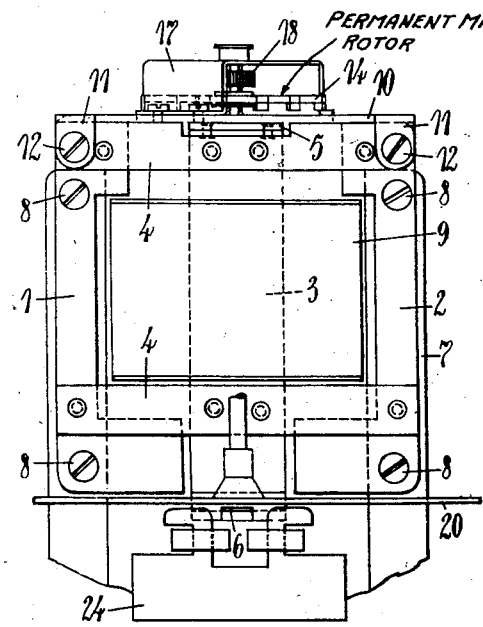

2,326,885

UNITED STATES PATENT OFFICE 2,326,885

INDUCTION TYPE ELECTRICITY INTEGRATING METER

John Prince and Maurice Whitehead, Hollinwood, England, assignors to Ferranti Electric Inc., New York, N. Y.

Application March 29, 1940, Serial No. 326,748
In Great Britain March 31, 1939

2 Claims. (Cl. 171—264)

This invention relates to induction type electricity integrating meters.

Generally the core of the shunt electromagnet of such meters has to carry a large flux, the bulk of which does no useful work, in order to produce the necessary phase relationship between the shunt driving flux and the applied potential.

An object of the present invention is to provide an induction type electricity integrating meter in which part of the flux set up in the core of a shunt electromagnet is employed for doing useful work other than driving the meter disc.

Another object of the present invention is to provide an improved induction type electricity integrating meter in which part of the flux set up in the core of a series electromagnet is employed for doing useful work other than driving the meter disc.

Many induction type electricity integrating meters such as two part tariff prepayment meters require an auxiliary source of mechanical power for driving a mechanism such as a fixed charge mechanism, and the invention enables such meters to be constructed cheaply, with economy in space and with a symmetrical disposition of said auxiliary source of mechanical power, thus preserving balanced operation of the meters.

Referring to the accompanying diagrammatic drawing:

Figure 1 is a front elevation of a meter embodying the present invention in one form, certain components being omitted for clarity.

Figure 2 is a part sectional side elevation thereof illustrating some of the components omitted from Figure 1.

Figure 3 is a plan view of the meter of Figures 1 and 2.

In carrying the invention into effect according to one form by way of example as illustrated in Figures 1 to 3 a prepayment induction type electricity meter is adapted for use on a two part tariff system. The meter includes a shunt electromagnet the core of which has three separate limbs 1, 2 and 3 situated side by side with their axes parallel to each other in a common plane. The two outer limbs 1, 2 each have both ends turned inwards towards the middle limb 3 and the three limbs are held in position relative to each other by two brass strips 4 at each end. A steel back plate 5 is held in contact with the top of the middle limb 3 and passes downwards parallel to the back thereof. At the bottom of the middle limb the back plate 5 is bent at right angles and attached to a so-called tongue piece 6 which projects between the poles of a series electromagnet core 24. The shunt electromagnet is attached to a steel frame 7 by means of bolts 8 which pass through the top and bottom of the two outer limbs 1, 2. The limbs are disposed vertically and the middle limb 3 carries a shunt coil 9. Attached to the tops of the two outer limbs and disposed horizontally is a circular steel plate 10 with a central hole formed therein and teeth projecting radially inwards. The plate 10 is attached to the limbs by means of bolts 12 which pass through holes in ears or flanges 11 formed integrally with the plate. A second steel plate 13 with teeth projecting radially outwards is disposed within the hole in the plate 10 with the teeth intermeshing but with a small clearance at all parts of the periphery. This second plate 13 is screwed to the top of the back plate. The two plates 10, 13 serve as the stator of a synchronous motor which has for its rotor a permanent magnet in the form of a six-legged spider 14. The spider is carried on a vertical spindle 15 the lower end of which is set in a brass bearing 16 attached to the inner steel plate 13 and the other end of which passes through a hole in a brass bracket 17 attached to the outside stator plate 10. Alternate limbs of the spider are of opposite polarity and at the outer extremity of each limb two teeth are formed which are similar in size to the stator teeth.

The teeth 14a, 14b of alternate pairs are magnetised north and the teeth 14c, 14d of the remaining pairs are magnetised south. The teeth 14a, 14b are spaced apart by a distance equal to that between two adjacent teeth on the steel plate 10 while teeth 14c, 14d are separated by a distance such that when a tooth 14c of each pair is opposite a tooth of the steel plate 13, the other tooth 14d of the same pair is opposite to the gap between the next adjacent tooth of the steel plate 13 and the preceding tooth of the plate 10.

The spindle 15 of the synchronous motor has a pinion 18 attached thereto which engages with a toothed wheel and communicates through gearing with one sun wheel 19 of a differential mechanism and another sun wheel 22 which is connected through gearing 21 to the meter disc 20. The third member 23 of this mechanism communicates the sum of the motions of the other two members 19, 22 to one member of a second differential mechanism (not shown) the other two members of which are connected, also by way of suitable gears, to a switch and a coin mechanism respectively. In other respects the meter is constructed in accordance with known methods.

In operation the shunt and series windings are connected in circuit in known manner, A. C. line potential being applied across the shunt winding 9. An alternating flux of supply frequency is thereby set up in the three limbs 1, 2, 3 of the shunt magnet core and it will be seen that the toothed steel plates 10, 13 forming the stator of the synchronous motor are of alternating polarities which are at any instant mutually opposite. This condition in conjunction with the special arrangement of the rotor poles indicated above ensures that the motor is self-starting and always runs at synchronous speed. The gearing between the rotor of the synchronous motor and the first differential mechanism is such that the requirements of the fixed charge part of the tariff are met.

The combined shunt and series driving fluxes cause the meter disc 20 to rotate when a load is imposed on the meter and the amount of electricity used is recorded in known manner.

We claim:

1. An induction electricity integrating meter including a shunt electromagnet core, a shunt coil thereon, two shunt magnet limbs separate from said core, an externally toothed stator member in magnetic connection with and symmetrically disposed in relation to said core, an internally toothed stator member concentrically disposed around said first-mentioned stator member and magnetically connected to said two limbs, a rotor, alternately polarised radial arms on said rotor and teeth on said arms co-acting magnetically with the teeth on said stator members.

2. An induction electricity integrating meter as claimed in claim 1, including also a two-limbed series electromagnet core, a back plate of magnetic material, magnetically connected to said shunt magnet core and a tongue piece of magnetic material attached to said back plate and projecting between the limbs of said series electromagnet core.

JOHN PRINCE.
MAURICE WHITEHEAD.